United States Patent
Arioka et al.

(10) Patent No.: US 6,383,596 B1
(45) Date of Patent: May 7, 2002

(54) OPTICAL RECORDING MEDIUM AND PROCESS FOR PRODUCING THE SAME

(75) Inventors: Hiroyuki Arioka, Nagano; Megumi Yoshimura, Chiba; Tsuyoshi Komaki, Komoro, all of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/581,210

(22) PCT Filed: Dec. 22, 1998

(86) PCT No.: PCT/JP98/05839

§ 371 Date: Jun. 21, 2000

§ 102(e) Date: Jun. 21, 2000

(87) PCT Pub. No.: WO99/34362

PCT Pub. Date: Jul. 8, 1999

(30) Foreign Application Priority Data

Dec. 24, 1997 (JP) ............................................... 9-367196

(51) Int. Cl.[7] ................................................. B32B 3/02
(52) U.S. Cl. ................. 428/64.1; 428/64.8; 430/270.14
(58) Field of Search .............................. 428/64.1, 64.2, 428/64.4, 64.8, 913; 430/270.14, 495.1, 945; 369/283, 288

(56) References Cited

U.S. PATENT DOCUMENTS

| | | | | |
|---|---|---|---|---|
| 5,574,715 A | * | 11/1996 | Namba | 369/288 |
| 5,616,447 A | * | 4/1997 | Arioka | 430/270.1 |
| 6,077,584 A | * | 6/2000 | Hurditch | 428/64.1 |
| 6,214,433 B1 | * | 4/2001 | Tronche | 428/64.1 |
| 6,246,656 B1 | * | 6/2001 | Kawakubo | 369/112 |

FOREIGN PATENT DOCUMENTS

| | | |
|---|---|---|
| JP | 58062841 | 4/1983 |
| JP | 59198545 | 11/1984 |
| JP | 01199339 | 8/1989 |
| JP | 04102241 | 4/1992 |
| JP | 04131280 | 5/1992 |
| JP | 04332928 | 11/1992 |
| JP | 05036133 | 2/1993 |
| JP | 06231488 | 8/1994 |
| JP | 07006408 | 1/1995 |
| JP | 07105572 | 4/1995 |
| JP | 07192315 | 7/1995 |
| JP | 07192316 | 7/1995 |
| JP | 07210899 | 8/1995 |
| JP | 09212915 | 8/1997 |
| JP | 09278831 | 10/1997 |

* cited by examiner

*Primary Examiner*—Elizabeth Evans
(74) *Attorney, Agent, or Firm*—Rader, Fishman & Grauer, PLLC (57) ABSTRACT

The invention provides an optical recording medium preventing deterioration of an organic dye, having improved durability and being highly reliable, as well as a process for producing the same.

The recording layer (3) including an organic dye as the main component, and the reflective layer (4) comprising a metal selected from Cu, Ag and Au or an alloy containing at least one of these metals, are formed in this order on substrate (2). An ultraviolet-curable material is laminated on the reflective layer (4) and cured by irradiation with UV rays at 200 to 1000 mJ/cm$^2$ in such a manner that a cure shrinkage factor is not more than 10% by volume to form the protective layer (5) so that the organic acid content in the resulting ultraviolet-cured resin is not more than 10 ppm by weight, whereby the optical disk (1) is obtained. The dye is preferably a cyanine type dye, and the reflective layer is preferably Cu, Ag or an alloy containing at least one of these metals.

5 Claims, 1 Drawing Sheet

Fig. 1

OPTICAL RECORDING MEDIUM AND PROCESS FOR PRODUCING THE SAME

TECHNICAL FIELD

The present invention relates to an optical recording medium, as well as a process for producing the same, and in particular an optical recording medium having a recording layer including an organic dye as the main component, as well as a process for producing the same.

BACKGROUND ART

In recent years, various optical recording disks such as recordable type disks or rewritable type disks attract attention as large-capacity information media. Optical recording disks having a recording layer including a dye as the main component can be produced at a low cost because the recording layer can be formed by coating.

The conventionally used optical recording disks having a recording layer including a dye as the main component are the disks of the so-called air-sandwiched structure provided with an air layer on the recording layer, and recently, optical recording disks capable of reproduce by providing a reflective layer so as to contact directly with the surface of a recording layer have been developed for meeting compact disk (CD) standards. That is, these optical recording disks are the disks having a recording layer including a dye as the main component, a reflective layer and a protective layer laminated in this order on a transparent substrate such as polycarbonate, said reflective layer being provided so as to contact directly with the recording layer, to achieve the disk overall thickness of 1.2 mm meeting CD standards.

Further, similar but high-density optical recording disks meeting DVD standards are also proposed.

In optical recording disks with such layer constitution, however, the moisture permeability of polycarbonate used as the substrate is high, so there is a problem that in a high humidity atmosphere, water permeates into the dye layer and deterioration of the dye proceeds in the presence of water.

The techniques of preventing water from permeating into a dye layer (or amorphous alloy thin layer) as the recording layer have been proposed heretofore. For example, Japanese Laid-Open Patent Publication No. 58-62841 describes the technique of providing a hard coat layer on the surface of a substrate, and Japanese Laid-Open Patent Publication No. 59-198545 describes the technique of providing an interlayer of organotitanium between a substrate and an alloy recording layer. Further, Japanese Laid-Open Patent Publication No. 4-102241 describes the technique of providing an interlayer comprising a heterocyclic compound between a substrate and a dye layer, and Japanese Laid-Open Patent Publication No. 4-131280 describes the technique in which a heterocyclic compound is included in a dye layer and a reflective layer comprises 2 layers. However, any techniques described in these publications require an additional layer for protecting the dye layer (or amorphous alloy thin layer), thus increasing the number of steps for production of optical recording disks and resulting in higher manufacturing costs.

Further, Japanese Laid-Open Patent Publication No. 6-231488 describes that the surface of a reflective layer at the side of a protective layer is treated with a triazine thiol type compound to prevent the progress of corrosion of the reflective layer. However, the technique described in this publication also requires an increase in the number of steps for production of optical recording disks and resulting in higher manufacturing costs.

In addition, an ultraviolet-curable resin for the protective layer is examined for preventing the corrosion of the metal layer itself. For example, Japanese Laid-Open Patent Publication No. 1-199339 defines an acid value in ultraviolet-curable resin; Japanese Laid-Open Patent Publication No. 5-36133 defines the amount of an organic acid ingredient in resin after cured; and Japanese Laid-Open Patent Publication No. 7-192315 defines the concentration of acrylic acid ions in the ultraviolet-cured resin layer. However, the object of any techniques described in these publications is to prevent the corrosion of the metal layer itself, and the corrosion of the dye layer is not referred to therein.

In particular, Japanese Laid-Open Patent Publication No. 7-192315 discloses that an ultraviolet-cured resin layer with 800 ppm or less acrylic acid ions is laminated on a thin metal layer formed on a substrate, and said ultraviolet-curable resin is cured, wherein low reflective Al or an Al alloy is used as said thin metal layer, and that the concentration of acrylic acid ions is made 800 ppm or less, whereby partial oxidative deterioration of the reflective layer is prevented. However, when Al or an Al alloy is used as the reflective layer, an optical recording disk with desired performance cannot be obtained because of the low reflectivity of the metal.

Accordingly, when a highly reflective metal or alloy is used as the reflective layer and an organic dye is used in the recording layer, there are still not known any techniques by which this deterioration of organic dye can be easily prevented.

DISCLOSURE OF THE INVENTION

OBJECT OF THE INVENTION

Accordingly, the object of the present invention is to provide an optical recording medium comprising a recording layer including an organic dye as the main component and a reflective layer comprising a highly reflective metal or alloy, as well as a process for producing said optical recording medium, said optical recording medium preventing deterioration of the organic dye, having improved durability and being highly reliable thereby solving the problems in the prior art as described above.

SUMMARY OF THE INVENTION

As a result of their eager study, the present inventors found that in an optical recording medium having a recording layer including an organic dye as the main component and a reflective layer comprising a highly reflective metal or alloy, an organic acid contained in an ultraviolet-cured layer laminated on the reflective layer induces the initial stage of deterioration of the dye layer.

Although the ultraviolet-cured resin layer is not contacted directly with the dye layer, it is believed that the organic acid in the ultraviolet-cured resin layer through the reflective layer forms a local cell in the interface between the dye layer and the reflective layer, to induce deterioration of the dye layer.

The present inventors focused their attention on a irradiation dose of UV rays to an ultraviolet-curable material to be laminated and cured on a reflective layer and the organic acid content in the cured resin layer, and they arrived at the present invention.

That is, the present invention relates to an optical recording medium comprising a recording layer and a reflective layer in this order on a substrate, said reflective layer having a protective layer thereon, wherein the recording layer includes an organic dye as the main component, the reflective layer comprises a metal selected from Cu, Ag and Au or an alloy containing at least one of these metals, and the protective layer is formed from an ultraviolet-cured resin which is cured by irradiating an ultraviolet-curable material with UV rays at 200 to 1000 mJ/cm$^2$ in such a manner that a cure shrinkage factor is not more than 10% by volume, and the organic acid content in said cured resin is not more than 10 ppm by weight.

Here, "cure shrinkage factor" refers to a ratio by volume of an ultraviolet-cured material shrunk by irradiation with UV rays and is expressed in the equation:

$$\text{Cure shrinkage factor } (\%) = [(v_1 - v_2)/v_1] \times 100$$

wherein:

$v_1$ is the volume of the ultraviolet-curable material before irradiation with UV rays, and $v_2$ is the volume of the ultraviolet-cured material after irradiation with UV rays.

The organic acid content in the ultraviolet-cured resin is a value quantitated by extracting an organic acid ingredient in pure water and analyzing this organic acid ingredient by ion chromatography.

The organic dye in the recording layer in the optical recording medium of the present invention is preferably a cyanine type dye. Further, the metal or alloy in the reflective layer is preferably a metal selected from Cu and Ag or an alloy containing at least one of these metals. Further, the organic acid content in the ultraviolet-curable material used in forming the protective layer is preferably not more than 200 ppm by weight.

Further, the present invention relates to a process for producing said optical recording medium which comprises forming a recording layer and a reflective layer in this order on a substrate and forming a protective layer on the reflective layer, wherein the recording layer is formed using an organic dye, the reflective layer is formed using a metal selected from Cu, Ag and Au or an alloy containing at least one of these metals, and the protective layer is formed by laminating an ultraviolet-curable material on the reflective layer and then curing the ultraviolet-curable material by irradiation with UV rays at 200 to 1000 mJ/cm$^2$ in such a manner that a cure shrinkage factor is not more than 10% by volume so that the organic acid content in the resulting ultraviolet-cured resin is not more than 10 ppm by weight In the production process of the present invention, the organic dye used in the recording layer is preferably a cyanine type dye. The metal or alloy in the reflective layer is preferably a metal selected from Cu and Ag or an alloy containing at least one of these metals. Further, the protective layer is formed preferably using an ultraviolet-curable material with an organic acid content of not more than 200 ppm by weight.

DETAILED DESCRIPTION OF THE INVENTION

Figure 1:
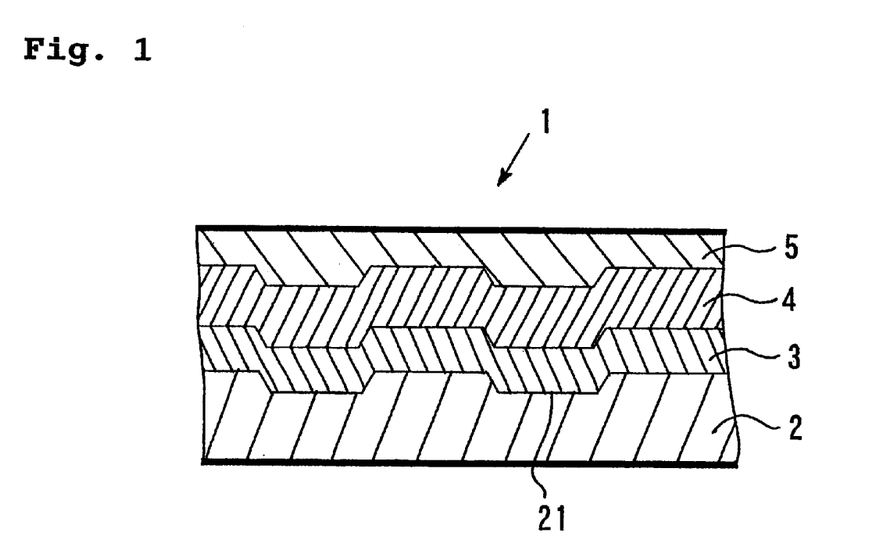
FIG. 1 is a partial sectional view of one example of the optical recording medium of the present invention.

An optical recording disk having the layer constitution shown in FIG. 1 as the optical recording medium, as well as a process for producing this optical disk, is described. That is, FIG. 1 is a partial sectional view of one example of the optical recording disk, wherein the optical recording disk (1) includes the coated-type recording layer (3) including a dye as the main component, the reflective layer (4) contacting directly with the recording layer (3), and the protective (5) on the reflective layer (4), in this order on a substrate (2).

Further, the optical recording medium may be constituted of above 2 disks sticking firmly to each other for example so as to meet DVD standards.

Substrate (2) is formed from glass or resin which is substantially transparent (preferably 88% or more transmittance) toward recording light and reproducing light (wavelength of about 600 to 900 nm). Its recording and reproducing at the side of the back of the substrate is thereby made feasible. The substrate material used is preferably resin, and various kinds of thermoplastic resin such as polycarbonate resin, acrylic resin and amorphous polyolefin are preferable.

Substrate (2) is in the form of a disk with an ordinary size, which when used as a recordable CD, has a thickness of 1.2 mm or so and a diameter of 80 to 120 mm or so. Such substrate (2) may be manufactured in any techniques known in the art, such as injection molding. In this manufacturing, a predetermined pattern such as groove (21) for tracking and addressing etc. is preferably formed on the surface of the substrate. Alternatively, a resin layer having a predetermined pattern such as groove by 2P method etc. may be formed after substrate (2) is manufactured.

According to DVD standards, its thickness is about 0.6 mm.

The groove is preferably a spiral continuous-type groove and has a depth of 50 to 300 nm, a width of 0.2 to 1.1 $\mu$m, and a land (portion between adjacent grooves) width of 0.3 to 1.4 $\mu$m. By such constitution of the groove, an excellent tracking signal can be obtained without reducing the reflection level in the groove portion. The groove can also be provided with concave and convex for addressing signal. Further, a recording light is preferably directed to the recording layer in the groove.

On this substrate (2), the recording layer (3) including an organic dye as the main component is formed.

For recording a signal, the extinction coefficient k (imaginary part of complex refractive index) at the wavelength of a recording light and reproducing light of the recording layer (3) is preferably 0.03 to 0.25. If k is less than 0.03, absorption rate of the recording layer is lowered to make recording difficult with usual recording power. On the other hand, if k exceeds 0.25, the reflectivity does not satisfy the standards thus making reproducing difficult. In addition, if k is 0.03 to 0.20 particularly 0.03 to 0.15, significantly good results are obtained.

The refractive index n (real part of complex refractive index) of the recording layer (3) is preferably 1.8 to 4.0, more preferably 2.0 to 3.0. Given n<1.8, the reflectivity is lowered while the degree of signal modulation tends to be reduced to make reproducing difficult. On the other hand, in order to achieve n>4.0, the acquisition of a raw material dye is difficult.

The light-absorptive organic dye used in the recording layer (3) is not particularly limited insofar as the absorption maximum lies in 500 to 900 nm, preferably 500 to 800 nm, and one or 2 or more dyes may be selected depending on the object from e.g. cyanine type, phthalocyanine type, naphthalocyanine type, anthraquinone type, azo type, triphenylmethane type, pyrylium or thiapyrylium salt type, squarylium type, croconium type, formazan type, metal complex dye etc. That is, the recording layer (3) may contain a single dye or may be constituted of a mixture of 2 or more compatible dyes.

As described above, various dyes can be used in the present invention, but the effect of the present invention is significant when the cyanine type dye is used. That is, because the cyanine type dye has a conjugated ion type structure, the cyanine type dye is inherently liable to deterioration by water as compared with the phthalocyanine type dye or the azo type dye. And then the deterioration of the cyanine type dye can be significantly inhibited according to the present invention.

Although the cyanine type dye is not particularly limited, it is preferably a cyanine dye having an indolenine ring, particularly a benzoindolenine ring, which may contain an aromatic condensed ring. And it is preferred that the indolenine rings are bonded via a methine chain.

A singlet oxygen quencher is also preferably mixed with the light-absorptive dye. Further, a dye cation and a singlet oxygen quencher anion which are ionically-bonded with each other are also preferably used as the light-absorptive dye.

The quencher is preferably a metal complex such as acetyl acetonate type, bisdithiol type such as bisdithio-α-diketone type and bisphenyldithiol type, thiocatechol type, salicylaldehyde oxime type, and thiobisphenolate type. Further, amine-type quenchers such as amine type compounds having a nitrogen radical cation and hindered amines are also preferable.

The dye which constitutes the bonded system is preferably a cyanine dye having an indolenine ring, and the quencher is preferably a metal complex dye such as bisphenyldithiol metal complex.

Further although the quencher may be added independently from the light-absorptive dye or may be used in a bonded form, the quencher is added preferably in an amount of 1 mole or less, particularly 0.05 to 0.8 mole or so, relative to the total amount of the light-absorptive dye. Light resistance is thereby improved.

As the dye used in the recording layer, a dye having n and k in the ranges described above may not only be selected from the light-absorptive dyes, dye-quencher mixtures, and dye-quencher bonded forms, but may also be newly synthesized by molecular design.

k for the recording light and reproducting light of the dye is varied from about 0 to 2 depending on its skeleton and substituent groups, so, in selecting a dye having k in the range of 0.03 to 0.25 for example, there is alimitation to its skeleton and substituent groups. Accordingly, the solvent for coating may be limited or cannot be coated depending on the material of the substrate, or vapor film forming can not be carried out. Further, when new molecular design is to be conducted, much labor is required for design and synthesis.

On the other hand, k of a mixed dye layer containing 2 or more dyes is found to be a value which depending on the k of the dye layer comprising each of the dyes used, almost corresponds to their mixing ratio. Accordingly, the recording layer (3) may be formed in the present invention by compatibilizing 2 or more dyes.

In this case, k almost proportional to the mixing ratio can be obtained in most of mixture systems of dyes. That is, when the mixing ratio of "i" kinds of dyes and "k" are Ci and ki respectively, k is almost ΣCiki. Accordingly, dyes having different "k" are mixed under the control of the mixing ratio, whereby a dye layer with k=0.03 to 0.25 can be obtained. Accordingly, the dye used can be selected from a wide range of dye groups.

This can also apply to improvements in wavelength dependency. The wavelength of a semiconductor laser is usually in the range of ±10 nm, and it is necessary to secure 70% or more reflectivity in the range of 770 nm to 790 nm in commercial CD players. Generally, the k value of a dye often depends on wavelength significantly, and even if k is a suitable value at 780 nm, it is often greatly unsuitable at 770 nm or 790 nm. In such cases, suitable n and k values can be always obtained in the range of 780±10 nm by mixing a second dye therein.

As a result, the limitation of the solvent for coating is relieved, so a dye easily synthesized at low costs, a dye excellent in characteristics, and a sparingly soluble dye can also be used.

If the recording layer (3) is used as a mixed dye layer, the dyes used may be selected from those having n of 1.6 to 6.5 and k of 0 to 2.

In addition, in measurement of n and k, a recording layer having a thickness of e.g. 40 to 100 nm is provided under actual conditions on a predetermined transparent substrate to prepare a measurement sample. Then, the reflectivity of the measurement sample through the substrate or the reflectivity thereof at the side of the recording layer is measured. The reflectivity is measured using mirror reflection (about 5°) by use of recording and reproducing light wavelengths. Further, the transmittance of the sample is measured. From these measured values, n and k may be calculated according to e.g. Kozo Ishiguro in Kyoritsuzensho "Kogaku", pp. 168–178.

Formation of the recording layer (3) can be conducted by a spin coating method. That is, a coating solution containing a dye and an organic solvent can be applied-spread onto the spinning substrate (2) to form the recording layer (3).

The organic solvent used in the coating solution for forming the recording layer can be selected from alcohol type, ketone type, ester type, ether type, aromatic type, halogenated alkyl type etc., as necessary depending on the dye used, but an organic solvent having 2 or more functional groups in the molecule is suitable.

After spin coating, the coated layer is dried as necessary.

The thickness of the recording layer thus formed is to be suitably set depending on desired reflectivity etc. but is usually about 100 to 300 nm.

A metal selected from Cu, Ag and Au or an alloy containing at least one of these metals is used to form the reflective layer (4) so as to contact directly with the recording layer (3).

If Au is used in the reflective layer, a local cell is hardly formed in the interface between the dye layer and the reflective layer described above, so the deterioration of the dye layer can be easily inhibited, but Au is expensive. Accordingly, a metal selected from Cu and Ag is preferably used in the present invention to form the reflective layer, moreover inhibiting the deterioration of the dye layer. Among Cu and Ag, Ag is more preferable because it is highly reflective and excellent in anticorrosion.

Further, in the present invention, an alloy containing at least one metal selected from Cu, Ag and Au can also be used to form the reflective layer.

As the Ag type alloy, those containing one or more elements selected from Cu, Ti, V, Ta, Cr, Mo, W, Mn, Fe, Co, Rh, Ni, Pd, Pt, Au, Al etc. in addition to Ag are preferable, and the content of Ag is preferably made 40 atomic % or more to achieve high reflectivity.

Formation of the reflective layer (4) can be conducted by various vapor film forming processes such as sputtering, deposition etc.

The thickness of the reflective layer (4) is preferably 20 nm or more. If the thickness is decreased, the reflectivity tends to be inadequate. By constituting the reflective layer in this way, the reflectivity (unrecorded portion) through the substrate when formed into an optical recording disk attains 60% or more, particularly 70% or more.

Then, an ultraviolet-curable material is laminated on the reflective layer (4) and then cured by irradiation with UV rays at 200 to 1000 mJ/cm² in such a manner that a cure shrinkage factor is not more than 10% by volume, whereby the protective layer (5) is formed. In this step, the resulting ultraviolet-cured resin is formed so that its organic acid content is not more than 10 ppm by weight.

Here, the organic acid is an organic compound having an acidic functional group, and examples include carboxylic acid RCOOH, sulfonic acid $RSO_3H$, sulfinic acid $RSO_2H$, phenol ArOH, enol RCH=CR' (OH), thiol RSH etc.

If the irradiation dose of UV rays to the ultraviolet-curable material is less than 200 mJ/cm², the organic acid content in the resulting cured resin is increased while its curing is inadequate, so the function of the resulting protective layer is not satisfactory. On the other hand, if the irradiation dose of UV rays exceeds 1000 mJ/cm², the cure shrinkage factor is increased, so there occurs the inconvenience of lager warpage of the disk. Further, the resin layer becomes brittle, and crack and peeling of the layer occur when the disk is used. The irradiation dose of UV rays is preferably about 200 to 1000 mJ/cm².

If the resin is cured at a cure shrinkage factor of not more than 10% by volume, the warpage of the disk can be controlled to be very small, so a reliable optical disk can be obtained. More preferably, the cure shrinkage factor is made 9% by volume or less.

If the organic acid content in the ultraviolet-cured resin obtained by curing is a small amount as not more than 10 ppm by weight, a local cell in the interface between the dye layer and the reflective layer is hardly formed, and thus the deterioration of the dye layer in the optical disk can be significantly delayed even during storage at high temperature under high humidity or during storage in an acidic atmosphere. The organic acid content in the ultraviolet-cured resin is more preferably not more than 5 ppm by weight.

The type of ultraviolet-curable material is not particularly limited, but the organic acid content in said material is preferably 200 ppm by weight or less, more preferably 180 ppm by weight or less. If this amount is 200 ppm by weight or less, the ultraviolet-cured resin layer with a less organic acid content is easily obtained by less irradiation dose of UV rays.

The ultraviolet-curable material is constituted preferably of an ultraviolet-curable compound or its composition for polymerization. Examples include monomers, oligomers, polymers etc. in which groups to be crosslinked or polymerized by irradiation with UV rays, such as acrylic type double bonds such as in ester compound of acrylate and methacrylate, allyl type double bonds such as in diallyl phthalate, and unsaturated double bonds such as in maleic acid derivatives, etc. have been contained or introduced into a molecule. These are preferably multifunctional, particularly trifunctional or more, and may be used alone or in combination thereof.

The ultraviolet-curable monomer is preferably a compound with a molecular weight of less than 2000, and the oligomer is preferably a compound with a molecular weight of 2000 to 10000. These include styrene, ethyl acrylate, ethylene glycol diacrylate, ethylene glycol dimethacrylate, diethylene glycol diacrylate, diethylene glycol methacrylate, 1,6-hexane glycol diacrylate, 1,6-hexane glycol dimethacrylate etc., and particularly preferable examples include pentaerythritol tetra(meth)acrylate, pentaerythritol (meth)acrylate, trimethylolpropane tri(meth)acrylate, trimethylolpropane di(meth)acrylate, (meth)acrylate of phenol ethylene oxide adduct, etc. Besides, the ultraviolet-curable oligomer includes oligoester acrylate, acrylic modified urethane elastomer etc.

In addition to or in place of the compounds described above, an ultraviolet-curable compound obtained by ultraviolet-responsievely-modifying thermoplastic resin may be used. Specifically, such ultraviolet-curable resins are resins having groups to be crosslinked or polymerized by irradiation with UV rays, such as acrylic type double bonds such as in ester compound of acrylate and methacrylate, allyl type double bonds such as in diallyl phthalate and unsaturated double bonds such as in maleic acid derivatives, etc. contained or introduced into the molecule of thermoplastic resin. Examples of thermoplastic resin which can be modified into ultraviolet-curable resin include vinyl chloride type copolymers, saturated polyester resin, poly(vinyl alcohol) type resin, epoxy type resin, phenoxy type resin, fiber derivatives etc.

The composition for polymerization is cured by irradiation with UV rays, and thus an optical polymerization initiator or a sensitizer is preferably contained in the composition for polymerization. The optical polymerization initiator or sensitizer used are not particularly limited, and for example, it can be suitably selected from those conventionally used, such as acetophenone type, benzoin type, benzophenone type, thioxantone type etc. As the optical polymerization initiator or sensitizer, plural compounds may be used in combination. The content of the optical polymerization initiator in the composition for polymerization is usually about 0.5 to 5% by weight. Such composition for polymerization may be synthesized in a usual manner, and it may be prepared using a commercial compound.

As the ultraviolet-curable material, a composition containing epoxy resin and a photo-cation polymerization catalyst is also preferably used.

The epoxy resin is preferably alicyclic epoxy resin, particularly the resin having 2 or more epoxy groups in the molecule. The alicyclic epoxy resin is preferably one or more of the following resins: 3,4-epoxycyclohexyl methyl-3,4-epoxycyclohexane carboxylate, bis-(3,4-epoxycyclohexylmethyl) adipate, bis-(3,4-epoxycyclohexyl) adipate, 2-(3,4-epoxycyclohexyl-5,5-spiro-3,4-epoxy) cyclohexane-metha-dioxane, bis(2,3-epoxycyclopentyl) ether and vinyl cyclohexene dioxide etc. Although the epoxy equivalent of alicyclic epoxy resin is not particularly limited, it is preferably 60 to 300, more preferably 100 to 200 for attaining excellent curable properties.

The photo-cation polymerization catalyst used may be any of known ones and is not particularly limited. For example, it is possible to use one or more of the followings: metal fluoroborates and boron trifluoride complexes, bis (perfluoroalkyl sulfonyl) methane metal salts, aryl diazonium compounds, aromatic onium salts of the group 6A elements, aromatic onium salts of the group 5A elements, dicarbonyl chelate of the groups 3A to 5A elements, thiopyrylium salts, the group 6A elements having MF6 anions (M is P, As or Sb), triaryl sulfonium complex salts, aromatic iodonium complex salts, aromatic sulfonium complex salts etc., and it is particularly preferable to use one or more of the followings: polyaryl sulfonium complex salts, aromatic sulfonium salts or iodonium salts of halogen-containing complex ions, and aromatic onium salts of the group 3A elements, the group 5A elements and the group 6A elements.

Further, it is also possible to use an photo-cation polymerization catalyst containing an organometal compound and an organosilicon compound having photodegradability. Such photo-cation polymerization catalyst is a non-strong acid type, so its adverse effect on a highly corrosive recording layer in an optical magnetic recording disk can be avoided. The organometal compounds are preferably complex compounds having an alkoxy group, phenoxy group, β-diketonato group etc. bonded to metal atoms such as Ti, V, Cr, Mn, Fe, Co, Ni, Cu, Zn, Al, Zr etc. Among these, organoaluminum compounds are particularly preferable, and specifically, tris-methoxy aluminum, tris-propionatoaluminum, tris-trifluoroacetyl aluminum and tris-ethylacetoacetonatoaluminum are preferable.

The organosilicon compounds having photodegradability are those generating silanol upon irradiation with UV rays etc., and silicon compounds having a peroxysilano group, o-nitrobenzyl group and α-ketosilyl group etc. are preferable.

The content of the photo-cation polymerization catalyst in the composition is 0.05 to 0.7 part by weight, particularly 0.1 to 0.5 part by weight relative to 100 parts by weight of epoxy resin.

Formation of the protective layer (5) can be conducted by laminating such ultraviolet-curable material on the reflective layer (4) and then curing it on the condition described above.

Lamination of the ultraviolet-curable material on the reflective layer (4) is preferably conducted by a spin coating method to prevent damage to the reflective layer, but may also be conducted by a screen printing method, a dipping method or a spray coating method etc. The conditions for lamination of the ultraviolet-curable material are not particularly limited and may be determined as necessary depending on the viscosity of the coating solution and desired thickness etc.

Then, the coating layer of the ultraviolet-curable material is cured by irradiation with UV rays at 200 to 1000 mJ/cm$^2$. Alternatively, the ultraviolet-curable material may be first heated and then irradiated with UV rays, depending on the case. Further, it may irradiated with electron beam etc. in place of UV rays. A source for UV rays may be conventional one such as mercury lamp. By irradiation with UV rays, the respective compounds described above are radical-polymerized and cured.

The thickness of the protective layer (5) is preferably about 1 to 20 μm. If the thickness is decreased, the anticorrosive effect of the reflective layer and the recording layer tends to be inadequate. On the other hand, if the thickness is increased, cracks resulting from shrinkage upon curing occur, or warpage of the disk is easily generated.

Further, a label printing layer may be provided on the protective layer (5).

According to the optical recording medium of the present invention, the recording layer includes an organic dye as the main component, the reflective layer comprises a metal selected from Cu, Ag and Au or an alloy containing at least one of these metals, and the protective layer comprises an ultraviolet-cured resin which is cured by irradiating an ultraviolet-curable material with UV rays at 200 to 1000 mJ/cm$^2$ in such a manner that a cure shrinkage factor is not more than 10% by volume, and the organic acid content in said cured resin is not more than 10 ppm by weight, and thus the organic acid content in the protective layer is sufficiently low and formation of a local cell in the interface between the dye layer and the reflective layer can be inhibited. Accordingly, the dye layer in the optical recording medium of the present invention can be kept stably even during storage at high temperature under high humidity or during storage in an acidic atmosphere and is thus highly reliable.

MODE FOR CARRYING OUT THE INVENTION

Hereinafter, the present invention is described in more detail with reference to the Examples, which however are not intended to limit the present invention.

In the Examples and Comparative Examples, the following ultraviolet-curable materials were used.
SD-318, from Dainippon Ink & Chemicals, Inc.
SD-211, from Dainippon Ink & Chemicals, Inc.
SD-17, from Dainippon Ink & Chemicals, Inc.
MD-341, from Nippon Kayaku Co., Ltd.
SD-2200, from Dainippon Ink & Chemicals, Inc.
(Organic Acid Content in the Ultraviolet-curable Material)

The organic acid content in each of the ultraviolet-curable materials was quantitated in the following method.

2 g of the ultraviolet-curable material/20 ml of pure water was stirred for 1 hour in a shaker (400 time/minute), left for 2 hours, separated by centrifugation into a material layer and an aqueous layer, and analyzed by ion chromatography.
<Conditions for Analysis by Ion Chromatography>
Analyzer: 4520i, produced by Dionex
Columns:
  AG4A-SC (guard column)
  AG4A-SC (separation column)
Eluent: 5.0 mM Na2B407
Flow rate: 2.0 ml/min.
Detector: Electrical conductance detector
Regeneration system: ARSS-I (electrolysis system)
<Results of Analysis by Ion Chromatography>
SD-318: organic acid content, 171 ppm by weight
SD-211: organic acid content, 261 ppm by weight
SD-17: organic acid content, 290 ppm by weight
MD-341: organic acid content, 189 ppm by weight
SD-2200: organic acid content, 220 ppm by weight
(Organic Acid Content in the Ultraviolet-cured Resin)

In the respective disk samples obtained in the Examples and Comparative Examples described below, the organic acid content in the ultraviolet-cured resin after curing by irradiation with UV rays was quantitated, as follows:

The ultraviolet-cured resin layer was cut into pieces, and 2 g ultraviolet-cured resin/20 ml pure water was sonicated for 1 hour in water under heating at 40° C., and thereafter, the extract was analyzed by ion chromatography. The conditions for analysis by ion chromatography are described above.
(Cure Shrinkage Factor)

The cure shrinkage factor was measured as follows.

10 cc ultraviolet-curable material before irradiation with UV rays was accurately weighed, and the volume ($v_1$) was determined. This material was applied onto a substrate whose volume was previously measured, and it was cured by irradiation with UV rays at a predetermined dose. The volume of the whole sample (that is, cured resin+substrate) after curing was determined, and the volume ($v_2$) of the ultraviolet-cured resin was calculated.

$$\text{Cure shrinkage factor (\%)}=[(v_1-v_2)/v_1]\times 100$$

EXAMPLE 1-1

A recordable type compact disk (CD-R) with the constitution shown in FIG. 1 was prepared.

First, the recording layer (3) with a thickness of 200 nm containing a dye was formed on the polycarbonate resin substrate (2) with a diameter of 120 mm and a thickness of 1.2 mm having spiral continuous grooves (21).

For formation of the recording layer (3), 5 parts by weight of a mixture of the cyanine type dye C1 (80% by weight) and singlet oxygen quencher Q (20% by weight) below was dissolved in 95 parts by weight of diacetone alcohol to form a coating solution and then the coating solution was applied by spin coating.

Then, the silver reflective layer (4) was formed by sputtering process on the recording layer (3). The thickness of the reflective layer was 80 nm.

Then, the ultraviolet-curable material (SD-318) was applied by spin coating to form a layer with an average thickness of 10 μm on the reflective layer (4) and cured by irradiation with UV rays at 1000 mJ/cm² whereby the protective layer (5) was formed.

The recordable type compact disk sample was obtained in this manner.

EXAMPLE 1-2

A disk sample was obtained in the same manner as in Example 1-1 except that the irradiation dose of UV rays was 500 mJ/cm².

EXAMPLE 1-3

A disk sample was obtained in the same manner as in Example 1-1 except that the irradiation dose of UV rays was 200 mJ/cm².

EXAMPLE 1-4

A disk sample was obtained in the same manner as in Example 1-1 except that the irradiation dose of UV rays was 500 mJ/cm² and that a gold-silver alloy (gold: silver=30:70 (ratio by weight)) was used as the reflective layer.

EXAMPLE 1-5

A disk sample was obtained in the same manner as in Example 1-4 except that copper was used as the reflective layer.

EXAMPLE 1-6

A disk sample was obtained in the same manner as in Example 1-2 except that the dye used was a mixture of cyanine type dye C2 (40% by weight) and cyanine type dye C3 (40% by weight) below and said singlet oxygen quencher Q (20% by weight).

EXAMPLE 1-7

A disk sample was obtained in the same manner as in Example 1-2 except that the solution for applying a dye was a solution of 3 parts by weight of azo type dye A below in 97 parts by weight of methyl cellosolve.

EXAMPLE 1-8

A disk sample was obtained in the same manner as in Example 1-2 except that the solution for applying a dye was a solution of 3 parts by weight of phthalocyanine type dye P below in 97 parts by weight of methyl cellosolve.

-continued

EXAMPLE 1-9

A disk sample was obtained in the same manner as in Example 1-4 except that gold was used as the reflective layer.

Comparative Example 1-1

A disk sample was obtained in the same manner as in Example 1-1 except that the irradiation dose of UV rays was 2000 mJ/cm$^2$.

Comparative Example 1-2

A disk sample was obtained in the same manner as in Example 1-1 except that the irradiation dose of UV rays was 100 mJ/cm$^2$.

Comparative Example 2-1

A disk sample was obtained in the same manner as in Example 1-1 except that MD-341 was used as the ultraviolet-curable material.

Comparative Example 2-2

A disk sample was obtained in the same manner as In Example 1-2 except that MD-341 was used as the ultraviolet-curable material.

Comparative Example 2-3

A disk sample was obtained in the same manner as in Example 1-3 except that MD-341 was used as the ultraviolet-curable material.

Comparative Example 2-4

A disk sample was obtained in the same manner as in Example 1-4 except that MD-341 was used as the ultraviolet-curable material.

Comparative Example 2-5

A disk sample was obtained in the same manner as in Example 1-5 except that MD-341 was used as the ultraviolet-curable material.

Comparative Example 2-6

A disk sample was obtained in the same manner as in Example 1-6 except that MD-341 was used as the ultraviolet-curable material.

Comparative Example 2-7

A disk sample was obtained in the same manner as in Example 1-7 except that MD-341 was used as the ultraviolet-curable material.

Comparative Example 2-8

A disk sample was obtained in the same manner as in Example 1-8 except that MD-341 was used as the ultraviolet-curable material.

Comparative Example 2-9

A disk sample was obtained in the same manner as in Comparative Example 1-1 except that MD-341 was used as the ultraviolet-curable material.

Comparative Example 2-10

A disk sample was obtained in the same manner as in Comparative Example 1-2 except that MD-341 was used as the ultraviolet-curable material.

Comparative Example 2-11

A disk sample was obtained in the same manner as in Example 1-9 except that MD-341 was used as the ultraviolet-curable material.

Comparative Example 3-1

A disk sample was obtained in the same manner as in Example 1-1 except that SD-2200 was used as the ultraviolet-curable material.

Comparative Example 3-2

A disk sample was obtained in the same manner as in Example 1-2 except that SD-2200 was used as the ultraviolet-curable material.

Comparative Example 3-3

A disk sample was obtained in the same manner as in Example 1-3 except that SD-2200 was used as the ultraviolet-curable material.

Comparative Example 3-4

A disk sample was obtained in the same manner as in Example 1-7 except that SD-2200 was used as the ultraviolet-curable material.

Comparative Example 3-5

A disk sample was obtained in the same manner as in Example 1-8 except that SD-2200 was used as the ultraviolet-curable material.

Comparative Example 3-6

A disk sample was obtained in the same manner as in Example 1-9 except that SD-2200 was used as the ultraviolet-curable material.

Comparative Example 3-7

A disk sample was obtained in the same manner as in Comparative Example 1-1 except that SD-2200 was used as the ultraviolet-curable material.

Comparative Example 3-8

A disk sample was obtained in the same manner as in Comparative Example 1-2 except that SD-2200 was used as the ultraviolet-curable material.

Comparative Example 4-1

A disk sample was obtained in the same manner as in Example 1-1 except that SD-211 was used as the ultraviolet-curable material.

Comparative Example 4-2

A disk sample was obtained in the same manner as in Example 1-2 except that SD-211 was used as the ultraviolet-curable material.

Comparative Example 4-3

A disk sample was obtained in the same manner as in Example 1-3 except that SD-211 was used as the ultraviolet-curable material.

Comparative Example 4-4

A disk sample was obtained in the same manner as in Example 1-7 except that SD-211 was used as the ultraviolet-curable material.

Comparative Example 4-5

A disk sample was obtained in the same manner as in Example 1-8 except that SD-211 was used as the ultraviolet-curable material.

Comparative Example 4-6

A disk sample was obtained in the same manner as in Example 1-9 except that SD-211 was used as the ultraviolet-curable material.

Comparative Example 4-7

A disk sample was obtained in the same manner as in Comparative Example 1-1 except that SD-211 was used as the ultraviolet-curable material.

Comparative Example 4-8

A disk sample was obtained in the same manner as in Comparative Example 1-2 except that SD-211 was used as the ultraviolet-curable material.

Comparative Example 5-1

A disk sample was obtained in the same manner as in Example 1-1 except that SD-17 was used as the ultraviolet-curable material.

Comparative Example 5-2

A disk sample was obtained in the same manner as in Example 1-2 except that SD-17 was used as the ultraviolet-curable material.

Comparative Example 5-3

A disk sample was obtained in the same manner as in Example 1-3 except that SD-17 was used as the ultraviolet-curable material.

Comparative Example 5-4

A disk sample was obtained in the same manner as in Example 1-7 except that SD-17 was used as the ultraviolet-curable material.

Comparative Example 5-5

A disk sample was obtained in the same manneras in Example 1-8 except that SD-17 was used as the ultraviolet-curable material.

Comparative Example 5-6

A disk sample was obtained in the same manner as in Example 1-9 except that SD-17 was used as the ultraviolet-curable material.

Comparative Example 5-7

A disk sample was obtained in the same manner as in Comparative Example 1-1 except that SD-17 was used as the ultraviolet-curable material.

Comparative Example 5-8

A disk sample was obtained in the same manner as in Comparative Example 1-1 except that SD-17 was used as the ultraviolet-curable material.

(Measurement of BLER)

The respective disk samples obtained in the manner described above were examined in an accelerated test under the following 2 conditions:

(1) 80° C., 80% RH, 500 hr (time);
(2) Sulfite gas atmosphere (5 ppm), 40° C., 80% RH, 100 hr, and their block error rate (BLER) was measured before and after the test.

For measurement of BLER, a CD-R recorder: 920S (Sony) was used for recording, and a CD measurement device: CD-CATS (Audio Development) was used to measure the inner circumferential part of each sample for 10 minutes, and an average number per 1 second (Count/Sec) was determined. The measurement results are shown in Table 1. The Orange book as the standards for CD-R requires that BLER should be 220 Count/Sec or less.

(Measurement of Mechanical Characteristics)

The respective disk samples thus obtained were examined for their mechanical characteristics in the following manner.

The vertical run out of the whole area of the disk, as well as the angular deviation of the disk in the radial direction, was determined with a measurement device ODA-2 model (Shindenshi Kogyo) and the maximum value of its absolute value was regarded as the measurement value. The Red book standards require that the vertical run out should be ±400 $\mu$m and the angular deviation be within ±0.6°.

The results of measurements described above are shown in Table 1 and Table 2.

TABLE 1

| | Ultraviolet-curable material | Irradiation dose of UV rays (mJ/cm$^2$) | Organic acid content in cured layer (ppm) | Reflection | Dye | Determined BLER (count/sec) Before accelerated test | Determined BLER (count/sec) After accelerated test (1) | Determined BLER (count/sec) After accelerated test (2) | Cure shrinkage factor (%) | Vertical run out ($\mu$m) Before accelerated test | Vertical run out ($\mu$m) After accelerated test (1) | Angular deviation (deg) Before accelerated test | Angular deviation (deg) After accelerated test (1) |
|---|---|---|---|---|---|---|---|---|---|---|---|---|---|
| Example 1-1 | SD-318 | 1000 | 4.2 | Silver | C1 | 4 | 15 | 18 | 9.0 | 208 | 260 | 0.25 | 0.27 |
| Example 1-2 | SD-318 | 500 | 4.4 | Silver | C1 | 9 | 21 | 24 | 8.5 | 122 | 179 | 0.23 | 0.24 |
| Example 1-3 | SD-318 | 200 | 9.5 | Silver | C1 | 10 | 130 | 127 | 7.5 | 73 | 96 | 0.21 | 0.23 |
| Example 1-4 | SD-318 | 500 | 4.4 | Gold/Silver | C1 | 7 | 30 | 28 | 8.5 | 120 | 180 | 0.23 | 0.25 |
| Example 1-5 | SD-318 | 500 | 4.4 | Copper | C1 | 12 | 25 | 23 | 8.5 | 125 | 185 | 0.22 | 0.25 |
| Example 1-6 | SD-318 | 500 | 4.4 | Silver | C2 + C3 | 10 | 31 | 24 | 8.5 | 118 | 180 | 0.23 | 0.24 |
| Example 1-7 | SD-318 | 500 | 4.4 | Silver | A | 98 | 103 | 114 | 8.5 | 119 | 178 | 0.23 | 0.25 |
| Example 1-8 | SD-318 | 500 | 4.4 | Silver | P | 100 | 117 | 120 | 8.5 | 123 | 181 | 0.23 | 0.24 |
| Example 1-9 | SD-318 | 500 | 4.4 | Gold | C1 | 7 | 14 | 15 | 8.5 | 120 | 182 | 0.23 | 0.25 |
| Comparative Example 1-1 | SD-318 | 2000 | 4.0 | Silver | C1 | 9 | 58 | 49 | 13.0 | 305 | 498 | 0.39 | 0.68 |
| Comparative Example 1-2 | SD-318 | 100 | 16.3 | Silver | C1 | 15 | 497 | 1038 | 6.0 | 58 | 121 | 0.18 | 0.20 |
| Comparative Example 2-1 | MD-341 | 1000 | 8.5 | Silver | C1 | 8 | 70 | 110 | 13.2 | 449 | 780 | 0.51 | 0.72 |
| Comparative Example 2-2 | MD-341 | 500 | 8.8 | Silver | C1 | 10 | 45 | 41 | 12.5 | 410 | 634 | 0.48 | 0.70 |
| Comparative Example 2-3 | MD-341 | 200 | 9.8 | Silver | C1 | 5 | 158 | 200 | 10.5 | 308 | 481 | 0.43 | 0.69 |
| Comparative Example 2-4 | MD-341 | 500 | 8.8 | Gold/Silver | C1 | 8 | 50 | 46 | 12.5 | 412 | 645 | 0.49 | 0.69 |
| Comparative Example 2-5 | MD-341 | 500 | 8.8 | Copper | C1 | 11 | 71 | 98 | 12.5 | 402 | 632 | 0.48 | 0.69 |
| Comparative Example 2-6 | MD-341 | 500 | 8.8 | Silver | C2 + C3 | 9 | 47 | 52 | 12.5 | 408 | 631 | 0.49 | 0.70 |
| Comparative Example 2-7 | MD-341 | 500 | 8.8 | Silver | A | 106 | 145 | 140 | 12.5 | 406 | 643 | 0.48 | 0.69 |
| Comparative Example 2-8 | MD-341 | 500 | 8.8 | Silver | P | 134 | 149 | 145 | 12.5 | 411 | 640 | 0.48 | 0.70 |
| Comparative Example 2-9 | MD-341 | 2000 | 7.0 | Silver | C1 | 11 | 36 | 98 | 15.3 | 510 | 715 | 0.58 | 0.79 |
| Comparative Example 2-10 | MD-341 | 100 | 13.5 | Silver | C1 | 18 | 377 | 650 | 3.2 | 103 | 188 | 0.19 | 0.30 |
| Comparative Example 2-11 | MD-341 | 500 | 8.8 | Gold | C1 | 11 | 21 | 18 | 12.5 | 415 | 638 | 0.49 | 0.69 |

Accelerated test (1): 80° C., 80% RH, 500 hr.
Accelerated test (2): Sulfite gas atmosphere (5 ppm), 40° C., 80% RH, 100 hr

TABLE 2

| | Ultraviolet-curable material | Irradiation dose of UV rays (mJ/cm$^2$) | Organic acid content in cured layer (ppm) | Reflection | Dye | Determined BLER (count/sec) Before accelerated test | Determined BLER (count/sec) After accelerated test (1) | Determined BLER (count/sec) After accelerated test (2) | Cure shrinkage factor (%) | Vertical run out ($\mu$m) Before accelerated test | Vertical run out ($\mu$m) After accelerated test (1) | Angular deviation (deg) Before accelerated test | Angular deviation (deg) After accelerated test (1) |
|---|---|---|---|---|---|---|---|---|---|---|---|---|---|
| Comparative Example 3-1 | SD-2200 | 1000 | 9.5 | Silver | C1 | 8 | 174 | 190 | 11.3 | 377 | 465 | 0.40 | 0.60 |
| Comparative Example 3-2 | SD-2200 | 500 | 10.8 | Silver | C1 | 10 | 254 | 281 | 9.3 | 214 | 381 | 0.21 | 0.43 |
| Comparative Example 3-3 | SD-2200 | 200 | 13.6 | Silver | C1 | 9 | 342 | 328 | 8.9 | 139 | 313 | 0.19 | 0.22 |
| Comparative Example 3-4 | SD-2200 | 500 | 10.8 | Silver | A | 114 | 176 | 180 | 9.3 | 210 | 389 | 0.21 | 0.43 |
| Comparative Example 3-5 | SD-2200 | 500 | 10.8 | Silver | P | 103 | 168 | 171 | 9.3 | 215 | 386 | 0.21 | 0.42 |
| Comparative Example 3-6 | SD-2200 | 500 | 10.8 | Gold | C1 | 9 | 21 | 25 | 9.3 | 218 | 382 | 0.21 | 0.43 |
| Comparative Example 3-7 | SD-2200 | 2000 | 9.0 | Silver | C1 | 9 | 155 | 163 | 12.1 | 195 | 491 | 0.47 | 0.63 |
| Comparative Example 3-8 | SD-2200 | 100 | 13.9 | Silver | C1 | 11 | 355 | 328 | 4.5 | 124 | 194 | 0.20 | 0.31 |
| Comparative Example 4-1 | SD-211 | 1000 | 10.5 | Silver | C1 | 13 | 241 | 238 | 10.5 | 329 | 516 | 0.48 | 0.65 |

TABLE 2-continued

| | Ultraviolet-curable material | Irradiation dose of UV rays (mJ/cm²) | Organic acid content in cured layer (ppm) | Reflection | Dye | Determined BLER (count/sec) Before accelerated test | After accelerated test (1) | After accelerated test (2) | Cure shrinkage factor (%) | Vertical run out (μm) Before accelerated test | After accelerated test (1) | Angular deviation (deg) Before accelerated test | After accelerated test (1) |
|---|---|---|---|---|---|---|---|---|---|---|---|---|---|
| Comparative Example 4-2 | SD-211 | 500 | 11.8 | Silver | C1 | 10 | 341 | 305 | 10.3 | 289 | 482 | 0.45 | 0.66 |
| Comparative Example 4-3 | SD-211 | 200 | 14.5 | Silver | C1 | 8 | 394 | 417 | 9.7 | 215 | 318 | 0.41 | 0.53 |
| Comparative Example 4-4 | SD-211 | 500 | 11.8 | Silver | A | 103 | 197 | 205 | 10.3 | 280 | 485 | 0.46 | 0.65 |
| Comparative Example 4-5 | SD-211 | 500 | 11.8 | Silver | P | 117 | 213 | 198 | 10.3 | 284 | 475 | 0.44 | 0.65 |
| Comparative Example 4-6 | SD-211 | 500 | 11.8 | Gold | C1 | 10 | 25 | 27 | 10.3 | 285 | 477 | 0.45 | 0.67 |
| Comparative Example 4-7 | SD-211 | 2000 | 9.3 | Silver | C1 | 11 | 168 | 179 | 11.5 | 310 | 505 | 0.50 | 0.65 |
| Comparative Example 4-8 | SD-211 | 100 | 15.0 | Silver | C1 | 10 | 405 | 431 | 5.2 | 126 | 201 | 0.20 | 0.32 |
| Comparative Example 5-1 | SD-17 | 1000 | 12.9 | Silver | C1 | 9 | 323 | 316 | 11.4 | 388 | 509 | 0.44 | 0.66 |
| Comparative Example 5-2 | SD-17 | 500 | 19.3 | Silver | C1 | 8 | 369 | 405 | 10.6 | 345 | 400 | 0.39 | 0.63 |
| Comparative Example 5-3 | SD-17 | 200 | 20.3 | Silver | C1 | 13 | 587 | 835 | 9.7 | 218 | 331 | 0.38 | 0.55 |
| Comparative Example 5-4 | SD-17 | 500 | 19.3 | Silver | A | 117 | 225 | 219 | 10.6 | 336 | 412 | 0.40 | 0.62 |
| Comparative Example 5-5 | SD-17 | 500 | 19.3 | Silver | P | 108 | 197 | 208 | 10.6 | 339 | 395 | 0.40 | 0.63 |
| Comparative Example 5-6 | SD-17 | 500 | 19.3 | Gold | C1 | 7 | 30 | 29 | 10.6 | 334 | 398 | 0.39 | 0.62 |
| Comparative Example 5-7 | SD-17 | 2000 | 9.8 | Silver | C1 | 8 | 195 | 188 | 13.2 | 377 | 475 | 0.53 | 0.69 |
| Comparative Example 5-8 | SD-17 | 100 | 21.5 | Silver | C1 | 15 | 764 | 834 | 4.7 | 120 | 205 | 0.21 | 0.30 |

Accelerated test (1): 80° C., 80% RH, 500 hr.
Accelerated test (2): Sulfite gas atmosphere (5 ppm), 40° C., 80% RH, 100 hr From Tables 1 and 2, it is evident that the disk samples in the Examples have no problem with BLER measurement values and vertical run out even after the accelerated test, indicating that they have practically adequate performance.

On the other hand, the cure shrinkage factor of the disk sample in Comparative Example 1-1 is large to cause large vertical run out. In Comparative Example 1-2, the organic acid content in the cured resin is high and the BLER after the accelerated test is deteriorated.

Further, as shown in Comparative Examples 2 to 5, if the organic acid content in the cured resin is high, the deterioration of BLER after the accelerated test is significant, and if the cure shrinkage factor is large, the vertical run out is large, so there is a problem for practical use.

Further, the deterioration degree of BLER in the disk sample using gold in the reflective layer (Example 1-9) after the accelerated test is generally lower than that of the disk samples using silver, copper etc. This is probably because a local cell in the interface between the dye layer and the reflective layer is hardly formed when gold is used in the reflective layer. From this, the present invention is particularly effective when silver, copper etc. are used in the reflective layer.

Further, the deterioration degree of BLER in the disk samples using the azo type dye or phthalocyanine type dye (Examples 1-7 and 1-8) after the accelerated test is generally lower than that of the disk sample using the cyanine type dye. This is because the azo type dye and phthalocyanine type dye are less deteriorated than the cyanine type dye having a conjugated ion-type structure having a methine chain. From this, the present invention is particularly effective when the cyanine type dye is used in the recording layer.

The present invention can be carried out in any other modes without departure from the sprit or major characteristics thereof. Accordingly, the above-described Examples are provided for purposes of illustration only and are not intended to be limiting. Further, any modification in a scope equivalent to the claims is within the scope of the present invention.

INDUSTRIAL APLICABILITY

According to the optical recording medium of the present invention, as described above, the protective layer comprises an ultraviolet-cured resin which is cured by irradiating an ultraviolet-curable material with UV rays at 200 to 1000 mJ/cm² in such a manner that the cure shrinkage factor is not more than 10% by volume and the organic acid content in said cured resin is not more than 10 ppm by weight, and thus the organic acid content in the protective layer is sufficiently low and the deterioration of the dye layer can be inhibited. As a result, the optical recording medium of the present invention can be kept stably even during storage at high temperature under high humidity or during storage in an acidic atmosphere and is thus highly reliable.

According to the process for producing an optical recording medium of the present invention, the optical recording medium described above can be obtained.

What is claimed is:
1. An optical recording medium comprising a recording layer and a reflective layer in this order on a substrate, said reflective layer having a protective layer thereon, wherein the recording layer includes an organic dye as the main component, the reflective layer comprises a metal selected from Cu, Ag and Au or an alloy containing at least one of these metals, and the protective layer is formed from an ultraviolet-cured resin which is cured by irradiating an ultraviolet-curable material with UV rays at 200 to 1000 mJ/cm$^2$ in such a manner that a cure shrinkage factor is not more than 10% by volume, and the organic acid content in said cured resin is not more than 10 ppm by weight.

2. An optical recording medium according to claim 1, wherein the organic dye in the recording layer is a cyanine type dye.

3. An optical recording medium according to claim 1, wherein the metal or alloy in the reflective layer is a metal selected from Cu and Ag or an alloy containing at least one of these metals.

4. An optical recording medium according to any one of claims 1 to 3, wherein the organic acid content in the ultraviolet-curable material used in forming the protective layer is not more than 200 ppm by weight.

5. A process for producing an optical recording medium which comprises forming a recording layer and a reflective layer in this order on a substrate and forming a protective layer on the reflective layer, wherein the recording layer is formed using an organic dye, the reflective layer is formed using a metal selected from Cu, Ag and Au or an alloy containing at least one of these metals, and the protective layer is formed by laminating an ultraviolet-curable material on the reflective layer and then curing the ultraviolet-curable material by irradiation with UV rays at 200 to 1000 mJ/cm$^2$ in such a manner that a cure shrinkage factor is not more than 10% by volume so that the organic acid content in the resulting ultraviolet-cured resin is not more than 10 ppm by weight.

* * * * *